United States Patent [19]

Arzoumanidis et al.

[11] Patent Number: 4,579,836

[45] Date of Patent: Apr. 1, 1986

[54] EXHAUSTIVELY PREPOLYMERIZED SUPPORTED ALPHA-OLEFIN POLYMERIZATION CATALYST

[75] Inventors: Gregory G. Arzoumanidis, Naperville; Sam S. Lee, Hoffman Estates; Benjamin S. Tovrog, Naperville, all of Ill.

[73] Assignee: Amoco Corporation, Chicago, Ill.

[21] Appl. No.: 736,941

[22] Filed: May 22, 1985

[51] Int. Cl.[4] .............................................. C08F 4/64
[52] U.S. Cl. .................................. 502/133; 502/108; 502/109; 502/118; 502/134
[58] Field of Search ............... 502/108, 109, 118, 133, 502/134

[56] References Cited

U.S. PATENT DOCUMENTS

| | | | |
|---|---|---|---|
| 4,295,991 | 10/1981 | Wristers | 502/108 X |
| 4,304,891 | 12/1981 | Sato et al. | 502/109 X |
| 4,324,693 | 4/1982 | Arzoumanidis et al. | 502/108 |
| 4,326,988 | 4/1982 | Welch et al. | 502/109 |
| 4,508,843 | 4/1985 | Etherton et al. | 502/108 X |

*Primary Examiner*—Patrick P. Garvin
*Attorney, Agent, or Firm*—Wallace L. Oliver; William T. McClain; William H. Magidson

[57] ABSTRACT

An exhaustively prepolymerized supported olefin polymerization catalyst component comprises solid, hydrocarbon-insoluble, magnesium-containing, titanium-containing catalyst particles which have been contacted with an olefin monomer and an organo-aluminum co-catalyst under exhaustive prepolymerization conditions at an Al/Ti atomic ratio such that the weight of prepolymer formed is less than 10 times the weight of such catalyst particles and the resulting prepolymerized catalyst particles essentially are inactive to further polymerization.

20 Claims, No Drawings

EXHAUSTIVELY PREPOLYMERIZED SUPPORTED ALPHA-OLEFIN POLYMERIZATION CATALYST

BACKGROUND OF THE INVENTION

This invention relates to olefin polymerization catalysts and particularly relates to a prepolymerized supported alpha-olefin polymerization catalyst which has been temporarily deactivated before use.

Use of solid, transition metal-based, olefin polymerization catalyst components is well known in the art including such solid components supported on a metal oxide, halide or other salt such as widely-described magnesium-containing, titanium halide-based catalyst components. Also well known is prepolymerizing a solid catalyst component with a small amount of olefin before introducing such component into a main polymerization reactor. Typically, such prepolymerization reduces catalyst attrition and thereby improves the resulting polymer morphology. Also, it has been found that such prepolymerized solid catalyst component suspends more readily in hydrocarbons, yields polymers of higher bulk density, and reduces formation of strings and lumps in gas-phase polymerizations.

In a typical prepolymerization method, solid catalyst component is contacted in a suitable diluent with a small amount of olefin monomer in a vessel separate from a main polymerization reactor and in the presence of a cocatalyst such as an organoaluminum compound. After a small amount of polymer is formed around the solid catalyst particle, a slurry of the prepolymerized catalyst component is introduced into a main reactor. A problem arises in a solventless polymerization process, such as a bulk or gas-phase process, in which solid catalyst component is flushed into a main reactor with liquid monomer. If a solid catalyst component is prepolymerized for use in such solventless processes in the necessary presence of a cocatalyst, polymerization will continue in the liquid monomer catalyst flush or transfer lines and causes such lines to plug.

The problem of preventing unwanted polymerization in catalyst transfer lines is described in U.S. Pat. No. 4,130,699, in which an olefin, such as ethylene or propylene, polymerization catalyst component temporarily deactivated with an agent such as alcohols, sulfides, ethers, ketones, hydrogen sulfide, or hydrogen chloride and subsequently reactivated in a main reactor. However, this technique is a complex procedure and is not preferred for prepolymerized highly active, supported catalysts.

This invention is a prepolymerized supported olefin polymerization catalyst component which is temporarily inactivated so that it may be transferred to a polymerization reactor.

SUMMARY OF THE INVENTION

An exhaustively prepolymerized supported olefin polymerization catalyst component comprises solid, hydrocarbon-insoluble, magnesium-containing, titanium-containing catalyst particles which have been contacted with an olefin monomer and an organoaluminum co-catalyst under exhaustive prepolymerization conditions at an Al/Ti atomic ratio such that the weight of prepolymer formed is less than 10 times the weight of such catalyst particles and the resulting prepolymerized catalyst particles essentially are inactive to further polymerization.

BRIEF DESCRIPTION OF THE INVENTION

Under many conditions, bare (non-prepolymerized) supported olefin polymerization catalyst components are unsuitable for direct use in a commercial olefin polymerization process because of a tendency of such bare catalyst components to attrit, i.e., break up into smaller particles. This causes too many small polymer particles to be formed which are undesirable especially in gas-phase polymerization processes. Although prepolymerization is well known to improve substantially such a catalyst attrition problem, such as Published European Patent application No. 27,386, prepolymerized solid, titanium-containing catalyst components, containing small amounts of adsorbed organoaluminum co-catalyst, remain catalytically active and polymerization will continue in the presence of olefin monomer. If liquid monomer is used to flush the solid catalyst component through catalyst feed lines, continued polymerization will result in line pluggage.

In this invention, active, prepolymerized, solid, supported catalyst component is temporarily deactivated, transferred into a main polymerization reactor in a substantially inactive state and then reactivated by contact with an organoaluminum-containing co-catalyst. Temporary inactivity of the titanium-containing component is achieved by exhaustive prepolymerization. In this technique, prepolymerization is conducted with a aluminum/titanium (Al/Ti) atomic ratio such that after no further prepolymer is formed, the weight ratio of prepolymer to solid catalyst particles is less than 1000 and such prepolymerized catalyst particles are essentially inactive to further polymerization. More preferably, an Al/Ti atomic ratio is used such that the resulting weight ratio of prepolymer to solid catalyst component is about 0.1 to about 7 and most preferably is about 0.5 to about 5. Typically, a suitable Al/Ti atomic ratio is about 0.2 to about 1.3 and preferably is about 0.4 to about 0.9 and more preferably about 0.5 to about 0.8.

The prepolymerized solid catalyst component of this invention essentially is inactive to further olefin polymerization activity as measured by the Static Tube Activity Test (STAT) or the Granulometer Activity Test (GMAT). In the STAT test, a solid prepolymerized catalyst component is contacted with an alpha-olefin, such as propylene, at room temperature and autogeneous pressure for 24 hours. No increase in weight of the solid indicates an "inactive" catalyst. In the GMAT test, a sample of prepolymerized catalyst (~100 mg) in hexane slurry is placed into a pipe reactor and contacted with propylene vapor at 50 psig at ambient temperature for 15 minutes. Catalyst particles are removed from the reactor and measured for particle size distribution using an instrument such as a Cilas 715 Granulometer. The particle size distribution of the reacted catalyst is compared to an unreacted sample. Any increase in particle size is measured as a change in grams of polymer per gram of catalyst, $\Delta(gPP/gCat)$, using a calibration curve of gPP/gCat vs. median particle size. No increase in particle size indicates an inactive catalyst. An acceptable exhaustively prepolymerized catalyst of this invention being essentially inactive should have a STAT or GMAT below 1.

The amount of prepolymer formed under exhaustive conditions is controlled by the Al/Ti atomic ratio in the catalyst system. In the presence of excess monomer, for a given Al/Ti atomic ratio (typically less than about 1.3), there is a maximum amount of prepolymer formed on the solid catalyst particle.

Suitable prepolymerization conditions include an excess of monomer under a pressure of about 5 to about 100 psig, typically about 15 to 40 psig and a temperature of between 30° and 140° F. (−1° to 60° C.). Prepolymerization time should extend at least to the time required to reach the maximum attainable amount of prepolymer and, preferably, is about one hour longer than such time. A typical prepolymerization time is about 3.5 hours. Preferred prepolymerization temperatures are about 60° to 135° F. (16° to 57° C.), more preferred about 70° to 100° F. (21° to 38° C.), and preferred pressures are about 20 to 35 psig.

In the exhaustive prepolymerization of this invention, a solid, hydrocarbon-insoluble, magnesium-containing, titanium-based, supported catalyst component is contacted with an olefin monomer in the presence of a suitable organoaluminum compound. Preferably, such prepolymerization is conducted in an inert hydrocarbon diluent useful in slurry-phase polymerization, such as hexane, and is in the presence of a modifier such as an organosilane compound. The slurry concentration of solid catalyst component in the diluent typically can range from about 1 to about 20 wt. % and preferably is about 2 to about 8 wt. %. The molar ratio of modifier compound to titanium typically can range from about 0.04 to about 1.2.

In an advantageous embodiment of this invention, a supported catalyst component is exhaustively prepolymerized at relatively low temperature (∼90° F.), preferably without co-catalyst modifier. In addition to relieving transfer line problems, this embodiment showed increased catalytic activity.

Although various organoaluminum compounds are useful in exhaustive prepolymerization such as those generally recognized for use as co-catalysts, the preferred organoaluminum compounds are trialkylaluminums and most preferably is triethylaluminum (TEA).

Cocatalyst modifiers which may be useful in prepolymerization include those generally useful for polymerization of olefins such as silanes, mineral acids, organometallic chalcogenide derivatives of hydrogen sulfide, organic acids, organic acid esters and mixtures thereof.

Organic electron donors useful as cocatalyst modifiers useful in this invention are organic compounds containing oxygen, silicon, nitrogen, sulfur, and/or phosphorus. Such compounds include organic acids, organic acid anhydrides, organic acid esters, alcohols, ethers, aldehydes, ketones, silanes, amines, amine oxides, amides, thiols, various phosphorus acid esters and amides, and the like. Mixtures of organic electron donors can be employed if desired.

Preferred organic acids and esters are benzoic acid, halobenzoic acids, phthalic acid, isophthalic acid, terephthalic acid and the alkyl esters thereof wherein the alkyl group contains 1 to about 6 carbon atoms such as methyl benzoate, methyl bromobenzoates, ethyl benzoate, ethyl chlorobenzoates, butyl benzoate, isobutyl benzoate, methyl anisate, ethyl anisate, methyl p-toluate, hexyl benzoate, and cyclohexyl benzoate, and diisobutyl phthalate as these give good results in terms of activity and stereospecificity and are convenient to use.

The polymerization co-catalyst useful in this invention advantageously contains an aromatic silane modifier. Preferable silanes useful in co-catalysts in this invention include alkyl-, aryl-, and/or alkoxy-substituted silanes containing hydrocarbon moieties with one to about 20 carbon atoms. Especially preferred silanes are aryl-substituted having a structure:

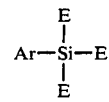

wherein Ar is an aryl group of about 6 to about 20 carbon atoms, such as phenyl, dodecylphenyl, cresyl, and the like, each E is independently R′ or OR′ with R′ having 1 to about 20 carbon atoms. The preferred aromatic silanes include diphenyldimethoxysilane, phenyltrimethoxysilane, phenylethyldimethoxysilane and methylphenyldimethoxysilane.

If a silane, such as diphenyldimethoxysilane, is used during prepolymerization, the Al/Si atomic ratio may affect the amount of extractables contained in the final polymer product. For example, if TEA is used as a prepolymerization co-catalyst with little or no silane, a high level of silane modifier is required in a main gas-phase polymerization to obtain polymer with extractables less than 2.5 wt. %. However, if relatively high amounts of silane are used during prepolymerization (e.g., Al/Si ∼1), less silane is required in the main polymerization. The Al/Si ratio may be varied in a range of about 5 to about 25, although at higher slurry concentrations, the optimum Al/Si ratio typically is less than at lower slurry concentrations.

Titanium-containing components useful in this invention generally are supported on hydrocarbon-insoluble, magnesium-containing compounds in combination with an electron donor compound. Such supported titanium-containing olefin polymerization catalyst component typically is formed by reacting a titanium(IV) halide, an organic electron donor compound and a magnesium-containing compound. Optionally, such supported titanium-containing reaction product may be further treated or modified by comminution or further chemical treatment with additional electron donor or Lewis acid species.

Suitable magnesium-containing compounds include magnesium halides; a reaction product of a magnesium halide such as magnesium chloride or magnesium bromide with an organic compound, such as an alcohol or an organic acid ester, or with an organometallic compound of metals of Groups I-III; magnesium alcoholates; or magnesium alkyls.

One possible magnesium-containing compound, described in U.S. Pat. No. 4,227,370, is based on at least one magnesium alcoholate which may be pretreated with at least one modifier such as mineral acid or anhydrides of sulfur, organometallic, chalcogenide derivative of hydrogen sulfide, and organic acids and esters thereof. Such magnesium-containing compound may be the pretreatment product of at least one magnesium alcoholate, at least one Group II or IIIA metal alkyl and, optionally, at least one modifier such as a mineral acid or an anhydride, sulfur, organometallic chalcogenide derivatives of hydrogen sulfide, organic acids and organic acid esters. Solid magnesium alkoxide may be milled prior to further treatment. In another catalyst component, magnesium ethoxide may be reacted with an aromatic ester such as phenyl benzoate prior to further treatment with a Lewis acid.

Another possible catalyst component is described in U.S. application Ser. No. 674,996, filed Dec. 26, 1984, assigned to a common assignee, incorporated by reference herein. The catalyst component described therein is prepared by complexing a magnesium alkyl composition with a specific class of hindered aromatic ester such as ethyl 2,6-dimethylbenzoate followed by reaction with a compatible precipitation agent such as silicon tetrachloride and a suitable titanium(IV) compound in combination with an organic electron donor compound in a suitable diluent.

The possible solid catalyst components listed above only are illustrative of many possible solid, magnesium-containing, titanium halide-based, hydrocarbon-insoluble catalyst components useful in this invention and known to the art. This invention is not limited to a specific supported catalyst component.

Titanium(IV) compounds useful in forming the solid component used in this invention include titanium halides and haloalcoholates having 1 to about 20 carbon atoms per alcoholate group. Mixtures of titanium compounds can be employed if desired. Preferred titanium compounds are the halides and haloalcoholates having 1 to about 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides, particularly titanium tetrachloride ($TiCl_4$), are most preferred.

Organic electron donors useful in preparation of stereospecific supported catalyst components many times can be organic compounds containing one or more atoms of oxygen, nitrogen, sulfur and phosphorus. Such compounds include organic acids, organic acid esters, alcohols, ethers, aldehydes, ketones, amines, amine oxides, amides, thiols and various phosphorous acid esters and amides and like. Mixtures of organic electron donors can be used if desired. Specific examples of useful oxygen-containing electron donor compounds include organic acids and esters. Useful organic acids contain from 1 to about 20 carbon atoms and 1 to about 4 carboxyl groups.

Preferred electron donor compounds include esters of aromatic acids. Preferred organic electron donors useful in catalyst components used in to this invention are $C_1$–$C_6$ alkyl esters of aromatic mono- and di-carboxylic acids and halogen-, hydroxyl-, oxo-, alkyl-, alkoxy-, aryl-, and aryloxy-substituted aromatic mono- and di-carboxylic acids. Among these, the alkyl esters of benzoic and halobenzoic acids wherein the alkyl group contains 1 to about 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate, are preferred. Other preferable esters include ethyl p-anisate and methyl-p-toluate. An especially preferred aromatic ester is a dialkylphthalate ester in which the alkyl group contains from about two to about ten carbon atoms. Examples of preferred phthalate ester are diisobutylphthalate, diethylphthalate, and di-n-butylphthalate.

Although not required, the solid reaction product prepared as described herein may be contacted with at least one liquid Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the above-described solid reaction product. Preferred Lewis acids include halides of Group III–V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixtures of Lewis acids can be employed if desired. Such Lewis acid may be used in a compatible diluent.

Although not required, the above-described solid reaction product may be washed with an inert liquid hydrocarbon or halogenated hydrocarbon before contact with a Lewis acid. If such a wash is conducted it is preferred to substantially remove the inert liquid prior to contacting the washed solid with Lewis acid.

Although the chemical structure of the titanium halide-based, magnesium-containing catalyst components described herein is not presently known, the components preferably contain from about 1 to about 6 wt. % titanium, from about 10 to about 25 wt. % magnesium, and from about 45 to about 65 wt. % halogen. Preferred catalyst components made according to this invention contain from about 1.0 to about 3 wt. % titanium, from about 15 to about 21 wt. % magnesium and from about 55 to about 65 wt. % chlorine.

The supported titanium-containing catalyst component used in this invention is used in a polymerization catalyst system containing a co-catalyst component including a Group II or III metal alkyls and, typically, one or more modifier compounds.

Useful Group II and IIIA metal alkyls are compounds of the formula $MR_m$ wherein M is a Group II or IIIA metal, each R is independently an alkyl radical of 1 to about 20 carbon carbon atoms, and m corresponds to the valence of M. Examples of useful metals, M, include magnesium, calcium, zinc, cadmium, aluminum, and gallium. Examples of suitable alkyl radicals, R, include methyl, ethyl, butyl, hexyl, decyl, tetradecyl, and eicosyl.

From the standpoint of catalyst component performance, preferred Group II and IIIA metal alkyls are those of magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_{12}H_{25})_2$, $Al(CH_3)_3$, $Al(C_2H_5)_3$, $Al(C_3H_7)_3$, $Al(C_4H_9)_3$, $Al(C_6H_{13})_3$, and $Al(C_{12}H_{25})_3$. More preferably a magnesium, zinc, or aluminum alkyl containing 1 to about 6 carbon atoms per alkyl radical is used. Best results are achieved through the use of trialkylaluminums containing 1 to about 6 carbon atoms per alkyl radical, and particularly triethylaluminum and triisobutylaluminum or a combination thereof.

If desired, metal alkyls having one or more halogen or hydride groups can be employed, such as ethylaluminum dichloride, diethylaluminum chloride, ethylaluminum sesquichloride, diisobutylaluminum hydride, and the like.

To maximize catalyst activity and stereospecificity, it is preferred to incorporate one or more modifiers, typically electron donors, and including compounds such as silanes, mineral acids, organometallic chalcogenide derivatives of hydrogen sulfide, organic acids, organic acid esters and mixtures thereof. Suitable co-catalyst modifiers include those described above as prepolymerization co-catalyst modifiers.

The above-described catalysts of this invention are useful in polymerization of alpha-olefins such as ethylene and propylene, and are most useful in stereospecific polymerization of alpha-olefins containing 3 or more carbon atoms such as propylene, butene-1, pentene-1,4-methylpentene-1, and hexene-1, as well as mixtures thereof and mixtures thereof with ethylene. The invented catalysts are particularly effective in the stereospecific polymerization of propylene or mixtures thereof with up to about 20 mole % ethylene or a higher alpha-olefin. Propylene homopolymerization is most preferred. According to the invention, highly crystalline polyalpha-olefins are prepared by contacting at least one alpha-olefin with the above-described catalyst compositions under polymerizing conditions. Such conditions include polymerization temperature and time, monomer pressure, avoidance of contamination of catalyst, choice of polymerization medium in slurry processes, the use of additives to control polymer molecular weights, and other conditions well known to persons of skill in the art. Slurry-, bulk-, and vapor-phase polymerization processes are contemplated herein.

The amount of catalyst to be employed varies depending on choice of polymerization technique, reactor size, monomer to be polymerized, and other factors known to persons of skill in the art, and can be determined on the basis of the examples appearing hereinafter. Typically, catalysts of this invention are used in amounts ranging from about 0.2 to 0.05 milligrams of catalyst to gram of polymer produced.

Irrespective of the polymerization process employed, polymerization should be carried out at temperatures sufficiently high to ensure reasonable polymerization rates and avoid unduly long reactor residence times. Generally, temperatures range from about 0° to about 120° C. with about 20° to about 95° C. being preferred from the standpoint of attaining good catalyst performance and high production rates. More preferably, polymerization according to this invention is carried out at temperatures ranging from about 50° to about 90° C.

Alpha-olefin polymerization according to this invention is carried out at monomer pressures of about atmospheric or above. Generally, monomer pressures range from about 20 to about 600 psi, although in vapor phase polymerizations, monomer pressures should not be below the vapor pressure at the polymerization temperature of the alpha-olefin to be polymerized.

The polymerization time will generally range from about one-half to several hours in batch processes with corresponding average residence times in continuous processes. Polymerization times ranging from about one to about four hours are typical in autoclave-type reactions. In slurry processes, the polymerization time can be regulated as desired. Polymerization times ranging from about one-half to several hours are generally sufficient in continuous slurry processes.

Diluents suitable for use in slurry polymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene, chloronaphthalene, ortho-dichlorobenzene, tetrahydronaphthalene, decahydronaphthalene; high molecular weight liquid paraffins or mixtures thereof, and other well-known diluents. It often is desirable to purify the polymerization medium prior to use, such as by distillation, percolation through molecular sieves, contacting with a compound such as an alkylaluminum compound capable of removing trace impurities, or by other suitable means.

Examples of gas-phase polymerization processes in which the catalyst of this invention is most useful include both stirred-bed reactors and fluidized-bed reactor systems are described in U.S. Pat. Nos. 3,957,448, 3,965,083, 3,971,768, 3,970,611, 4,129,701, 4,101,289; 3,652,527 and 4,003,712 all incorporated by reference herein. Typical gas phase olefin polymerization reactor systems comprise a reactor vessel to which olefin monomer and catalyst components can be added and which contain an agitated bed of forming polymer particles. Typically, catalyst components are added together or separately through one or more valve-controlled ports in the reactor vessel. Olefin monomer, typically, is provided to the reactor through a recycle gas and liquid system in which unreacted monomer removed as off-gas and fresh feed monomer are mixed and injected into the reactor vessel. A quench liquid, which can be liquid monomer, can be added to polymerizing olefin through the liquid recycle system in order to control temperature.

Irrespective of polymerization technique, polymerization is carried out under conditions that exclude oxygen, water, and other materials that act as catalyst poisons. Typically, no special precautions need be taken to exclude such materials because a positive pressure of monomer gas commonly exists within the reactor.

Also, according to this invention, polymerization can be carried out in the presence of additives to control polymer molecular weights. Hydrogen is typically employed for this purpose in a manner well known to persons of skill in the art.

Although not usually required, upon completion of polymerization, or when it is desired to terminate polymerization or deactivate the catalysts of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Polymer yields are sufficiently high relative to the amount of catalyst employed so that useful products can be obtained without separation of catalyst residues. Further, levels of stereo-random by-products are sufficiently low so that useful products can be obtained without separation thereof. The polymeric products produced in the presence of the invented catalysts can be fabricated into useful articles by extrusion, injection molding, and other common techniques.

The invention described herein is illustrated, but not limited, by the following Examples.

EXAMPLE 1

A 5 wt. % suspension of 15 grams of solid, hydrocarbon-insoluble, magnesium-containing, electron donor-containing, titanium chloride-based catalyst component in 200 milliliters of hexane and 0.7 milliliters of triethylaluminum (TEA) was placed in a one-half liter bottle. A co-catalyst solution containing 6.6 milliliters of 0.1 molar hexane solution of diphenyldimethoxysilane (DPDMSi) in 3.0 milliliters of 25% TEA solution in hexane was transferred to a one-liter glass autoclave containing 232 milliliters of dry hexane agitated at 600 rpm at ambient temperature under 10–15 psig of purified nitrogen. After agitation for ten minutes, the prepared suspension of solid catalyst component added and agitation continued for another ten minutes. The Al/Ti atomic ratio was 0.8/1. The autoclave was depressurized to about 1 psig and charged slowly over 1–2 hours with a total of 90 grams of propylene during which time the pressure was maintained at 35 psig. After continued agitation for one hour, polymer product was recovered, washed two times with 200 milliliter-portions of hexane.

A series of propylene polymerization runs was performed in a laboratory scale continuous unit based on that described in U.S. Pat. No. 3,965,083. A cylindrical reactor vessel of approximately four inches in diameter and 12 inches in length was equipped with three recycle gas nozzles spaced equidistantly along the bottom of the reactor and three liquid quench nozzles spaced equidistantly along the top of the reactor. The reactor was equipped with an off-gas port for recycling reactor gas through a condenser and back through a recycle line to the recycle nozzles in the reactor. Propylene liquid was used as the quench liquid. During operation polypropylene powder was produced in the reactor bed, flowed over a weir, and discharged though a powder discharge system into a secondary closed vessel blanketed with nitrogen. Polymerization temperature and pressure were maintained at 160° F. (71° C.) and 300 psig respectively. The polymer bed was agitated by paddles attached to a longitudinal shaft with in the reactor rotating at about 50 rpm. Hydrogen content in the reactor vapor was maintained at 0.2–0.4 wt. %. Titanium-containing catalyst component was introduced into the reactor through a liquid propylene-flushed catalyst addition nozzle. Mixed co-catalyst (TEA and DPDMSi in a hexane slurry), maintained at 70° F. (21° C.) was added through a co-catalyst addition nozzle flushed with propylene.

EXAMPLES 2–17

Additional examples of exhaustive prepolymerization were undertaken using the technique described in Example 1 but varying Al/Ti, Al/Si, modifier, time and temperature. Also, two comparative Runs (A and B) were performed without prepolymerization. Results are shown in Table I.

Table I summarizes the polymerization results using prepolymerized, solid catalyst components of this invention. Data in this Table show the Al/Ti and Al/Si atomic ratios used during prepolymerization together with the amount of polypropylene formed on the solid catalyst particle. Also shown is the Static Tube Activity Test (STAT) and GMAT data when measured for the prepolymerized catalyst particles, molar ratios of the cocatalyst components and polymerization results. "Yield" (grams of polymer produced per gram of solid catalyst component) was determined by magnesium analysis of the polymer product. "Extractables" were determined by measuring the loss in weight of a dry sample of ground polymer after being extracted in boiling n-hexane for six hours. Generally, the exhaustive prepolymerized catalyst components of this invention were transferred into the gas-phase reactor with liquid propylene flush without difficulty.

TABLE I

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Prepolymerization | | | | | | | | | | | | |
| Al/Ti (atomic ratio) | 0.80 | 0.80 | 0.35 | 0.58 | 1.0 | 1.17 | 0.58 | 0.80 | 0.80 | 1.48 | 0.8 | 0.8 |
| Al/Si (atomic ratio) | 9.0 | 7.0 | 7.0 | 7.0 | 7.0 | 10.9 | 0 | 0 | 0 | 0 | 7.0 | 7.0 |
| PP/cat (g/g × 100) | 575 | 350 | 16 | 73 | 302 | 586 | 436 | 266 | 370 | 361 | | |
| Slurry Conc. (wt. %) | 5.0 | 10.0 | 19.5 | 10 | 10 | 1.5 | 1.5 | 1.6 | 1.6 | 5.0 | 10.0 | 10.0 |
| Time (hrs.) | 2.5 | 2.0 | 1.0 | 2.5 | 2.5 | 4.0 | 0.5 | 1.5 | 1.0 | 2.0 | 3.0 | 2.0 |
| Temp. (°C.) | 38 | 32 | 23 | 43 | 32 | 27 | 32 | 52 | 32 | 57 | 48 | 52 |
| STAT (g/g) | 0 | — | 0 | — | — | 0 | — | — | — | — | — | — |
| GMAT (g/g) | — | 0.5 | — | 0 | 0 | — | — | — | 0.5 | — | — | — |
| Polymerization | | | | | | | | | | | | |
| TEA/DPDMSi/Ti (molar ratio) | 100/5/1 | 50/5/1 | 50/5/1 | 50/5/1 | 50/5/1 | 100/5/1 | 50/5/1 | 50/5/1 | 50/5/1 | 100/20/1 | 50/5/1 | 50/5/1 |
| Yield (g/g) | 12700 | 10300 | 8640 | 10600 | 11500 | 16500 | 14600 | 10600 | 12700 | 12100 | 9050 | 10300 |
| Extractables (wt. %) | 2.2 | 1.7 (1) | 1.8 (1) | 2.5 | 2.0 | 2.3 | 1.6 | 1.8 | 1.8 | 2.0 | 2.0 | 2.2 |

| | Examples | | | | | |
|---|---|---|---|---|---|---|
| | 13 | 14 | 15 | 16 | 17 | A | B |
| Prepolymerization | | | | | | | |
| Al/Ti (atomic ratio) | 1.0 | 0.58 | 0.8 | 0.8 | 0.35 | — | — |
| Al/Si (atomic ratio) | 7.0 | 7.0 | 0 | (2) | (2) | — | — |
| PP/cat, (g/g × 100) | 357 | 83 | 330 | 241 | 4 | — | — |
| Slurry Conc. (wt. %) | 10.0 | 15.3 | 1.5 | 1.5 | 1.6 | — | — |
| Time (hrs.) | 1.0 | 2.0 | 1.0 | 1.0 | 1.0 | — | — |
| Temp. (°C.) | 32 | 32 | 32 | 49 | 43 | — | — |
| STAT (g/g) | — | — | — | — | — | — | — |
| GMAT (g/g) | — | — | — | — | — | — | — |
| Polymerization | | | | | | | |
| TEA/DPDMSi/Ti | 50/5/1 | 50/5/1 | 50/5/1 | 50/5/1 | 50/5/1 | 50/5/1 | 50/5/1 |

TABLE I-continued

| | | | | | | | |
|---|---|---|---|---|---|---|---|
| (molar ratio) | | | | | | | |
| Yield (g/g) | 9750 | 9300 | 13100 | 10900 | 8300 | 1000 | 12350 |
| Extractables (wt. %) | 1.7 | 1.8 | 1.8 | 1.6 | 1.2 | 1.8 | 1.4 |

(1) No H₂ during prepolymerization
(2) No silicon compound added

What is claimed is:

1. An exhaustively prepolymerized supported olefin polymerization catalyst component comprising solid, hydrocarbon-insoluble, magnesium-containing, titanium-containing catalyst particles which have been contacted with an olefin monomer and an organoaluminum co-catalyst under exhaustive prepolymerization conditions at an Al/Ti atomic ratio such that the weight of prepolymer formed is less than 10 times the weight of such catalyst particles and the resulting prepolymerized catalyst particles essentially are inactive to further polymerization.

2. The exhaustively prepolymerized supported catalyst component of claim 1 wherein the Al/Ti atomic ratio is about 0.2 to 1.3.

3. The exhaustively prepolymerized supported catalyst component of claim 1 wherein the Al/Ti atomic ratio is about 0.4 to 0.9.

4. The exhaustively prepolymerized supported catalyst component of claim 1 wherein the Al/Ti atomic ratio is about 0.5 to 0.8.

5. The exhaustively prepolymerized supported catalyst component of claim 1 wherein the weight of prepolymer is about 0.1 to about 7 times the weight of the catalyst particles.

6. The exhaustively prepolymerized supported catalyst component of claim 1 wherein the weight of prepolymer is about 0.5 to about 5 times the weight of the catalyst particles.

7. The exhaustively prepolymerized supported catalyst component of claim 1 wherein the resulting prepolymerized catalyst particles show a Static Tube Activity Test of less than 1.

8. The exhaustively prepolymerized supported catalyst component of claim 1 wherein the resulting prepolymerized catalyst particles show a Granulometer Activity Test of less than 1.

9. The exhaustively prepolymerized supported catalyst component of claim 1 wherein the prepolymerization conditions include a temperature of about 30° to about 140° F. and a pressure of about 5 to about 100 psig.

10. The exhaustively prepolymerized supported catalyst component of claim 1 wherein the prepolymerization conditions include a temperature of about 60° to about 135° F. and a pressure of about 15 to about 40 psig.

11. The exhaustively prepolymerized supported catalyst component of claim 1 wherein the prepolymerization conditions include a temperature of about 70° to about 100° F. and a pressure of about 20 to about 35 psig.

12. The exhaustively prepolymerized supported catalyst component of claim 1 wherein the organoaluminum co-catalyst comprises trialkylaluminum.

13. The exhaustively prepolymerized supported catalyst component of claim 1 wherein the organoaluminum co-catalyst comprises triethylaluminum.

14. The exhaustively prepolymerized supported catalyst component of claim 1 wherein the solid catalyst component comprises a hydrocarbon-insoluble particles containing magnesium, titanium and chlorine together with an electron donor compound.

15. The exhaustively prepolymerized supported catalyst component of claim 1 wherein during prepolymerization no co-catalyst modifier is used.

16. An exhaustively prepolymerized supported olefin polymerization catalyst component comprising solid, hydrocarbon-insoluble, magnesium-containing, titanium-containing, electron-donor-containing catalyst particles which have been contacted with propylene monomer and an trialkyl aluminum co-catalyst under exhaustive prepolymerization conditions at an Al/Ti atomic ratio between about 0.2 and 1.3 such that the weight of prepolymer formed is less than 10 times the weight of such catalyst particles and the resulting prepolymerized catalyst particles essentially are inactive to further polymerization.

17. The exhaustively prepolymerized supported catalyst component of claim 16 wherein the prepolymerization co-catalyst is triethylaluminum.

18. The exhaustively prepolymerized supported catalyst component of claim 16 wherein the Al/Ti atomic ratio is about 0.4 to 0.9.

19. The exhaustively prepolymerized supported catalyst component of claim 18 wherein the prepolymerization temperature is about 70° to about 100° F. and wherein during prepolymerization no co-catalyst modifier is used.

20. The exhaustively prepolymerized supported catalyst component of claim 16 wherein the resulting prepolymerized catalyst particles show a Granulometer Activity Test of less than 1.

* * * * *